United States Patent
Paddock

[19]

[11] Patent Number: 6,065,240
[45] Date of Patent: May 23, 2000

[54] ARM REST FOR POLE-LIKE OBJECTS

[76] Inventor: William L. Paddock, 7546 S. Newland St., Littleton, Colo. 80128

[21] Appl. No.: 09/107,021

[22] Filed: Jun. 29, 1998

[51] Int. Cl.[7] ............................ A01K 97/10; A01K 87/08
[52] U.S. Cl. .................................. 43/21.2; 43/25
[58] Field of Search ................... 43/18.1, 21.2, 43/23, 25; 248/535, 689, 540, 541, 534, 231.81, 230.1; 224/222, 251, 267, 922

[56] References Cited

U.S. PATENT DOCUMENTS

| | | | |
|---|---|---|---|
| 712,843 | 11/1902 | Paul | 224/267 |
| 988,923 | 4/1911 | Bauerfeind | 43/25 |
| 1,266,367 | 5/1918 | Wilson | 43/25 |
| 2,158,104 | 5/1939 | Bowen | 43/25 |
| 2,653,406 | 9/1953 | Grabiak et al. | 43/25 |
| 2,761,236 | 9/1956 | Gaston | 43/25 |
| 2,869,276 | 1/1959 | Hagen | 43/25 |
| 3,010,242 | 11/1961 | Emanuel | 43/21.2 |
| 3,372,509 | 3/1968 | Arsenault | 43/21.2 |
| 3,372,510 | 3/1968 | Arsenault | 43/21.2 |
| 3,410,016 | 11/1968 | Arsenault | 43/21.2 |
| 4,041,635 | 8/1977 | Savage | 43/25 |
| 4,190,977 | 3/1980 | Casper | 43/21.2 |
| 4,244,132 | 1/1981 | Hoffman et al. | 43/21.2 |
| 4,559,735 | 12/1985 | Batick, Jr. | 43/21.2 |
| 4,651,461 | 3/1987 | Williams | 43/23 |
| 4,858,365 | 8/1989 | Struntz | 43/23 |
| 5,363,586 | 11/1994 | Balkenbush | 43/23 |
| 5,390,438 | 2/1995 | Warren, Jr. | 43/23 |
| 5,426,884 | 6/1995 | Makowsky | 43/25 |
| 5,910,004 | 6/1999 | Antosh | 43/21.2 |
| 5,941,012 | 8/1999 | Dominguez | 43/21.2 |

FOREIGN PATENT DOCUMENTS

| | | | |
|---|---|---|---|
| 5-7445 | 1/1993 | Japan | 43/21.2 |

*Primary Examiner*—Michael J. Carone
*Assistant Examiner*—Darren W. Ark
*Attorney, Agent, or Firm*—Timothy J. Martin; Michael R. Henson; Mark H. Weygandt

[57] ABSTRACT

An arm rest for use with a fishing pole supports a user's forearm while fishing and broadly comprises a mount adapted to releasably attach to the butt end portion of the fishing pole and a forearm cradle. The forearm cradle is pivotally disposed on the mount and is operative to move between a stowed position wherein the forearm cradle extends along a longitudinal axis of the fishing pole and a deployed position wherein the forearm cradle extends at an angle relative to the longitudinal axis to elevate the user's forearm above the butt end portion. A selectively actuable locking mechanism engagedly retains the forearm cradle in the stowed position and disengages from the forearm cradle to permit the forearm cradle to pivot between the stowed and deployed positions. A finger slide actuates the locking mechanism between the locked and unlocked positions. A spring may also be interconnected between the forearm cradle and the mount to resiliently urge the forearm cradle into the deployed position. A fishing pole is also provided which incorporates an arm rest having these features.

20 Claims, 6 Drawing Sheets

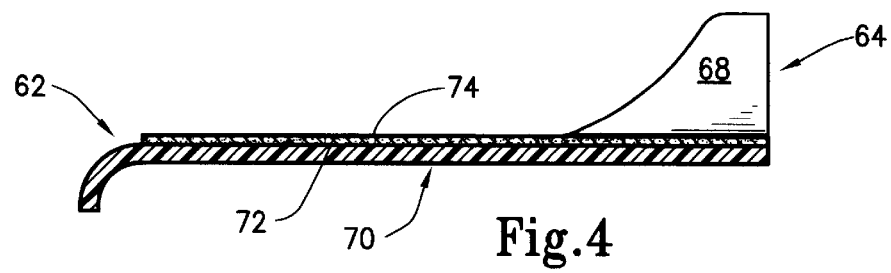
Fig.4
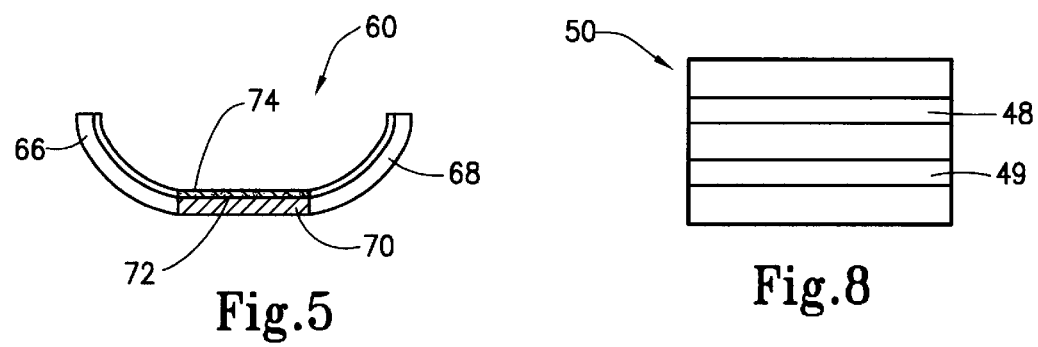
Fig.5
Fig.8
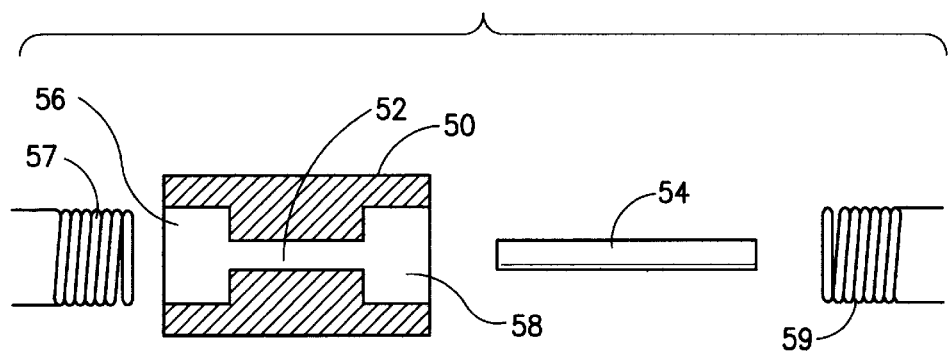
Fig.9

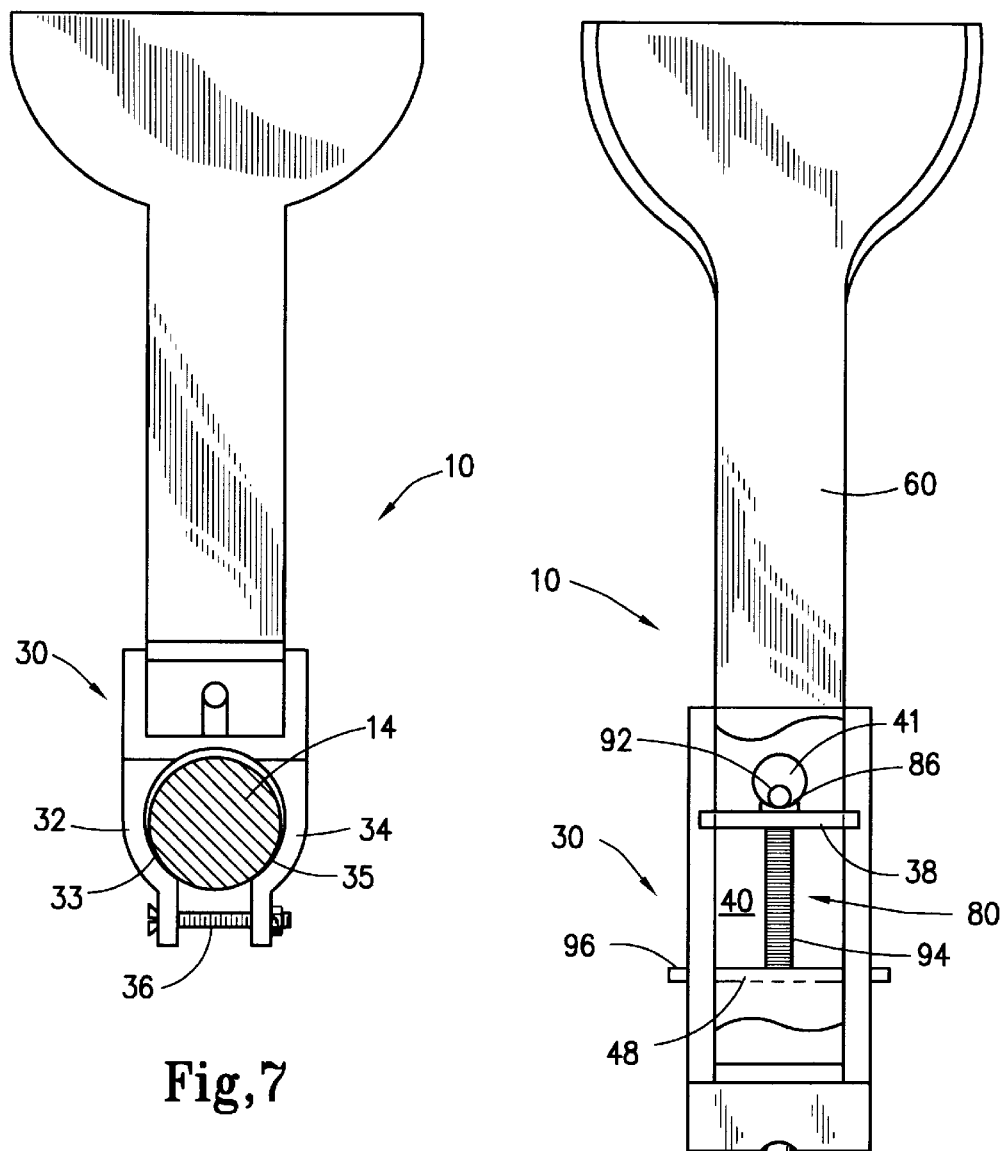
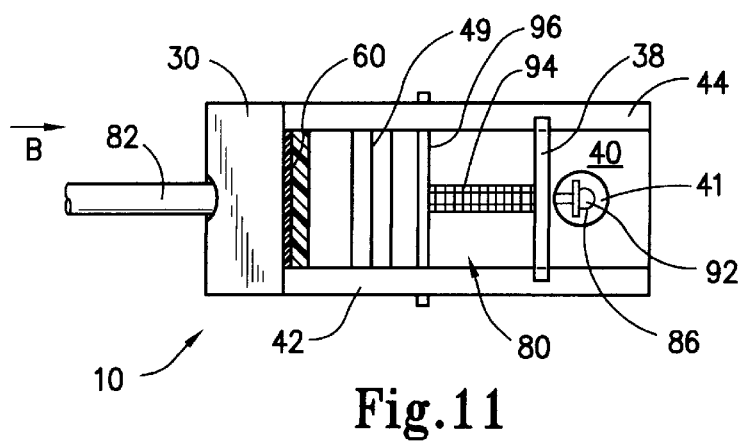

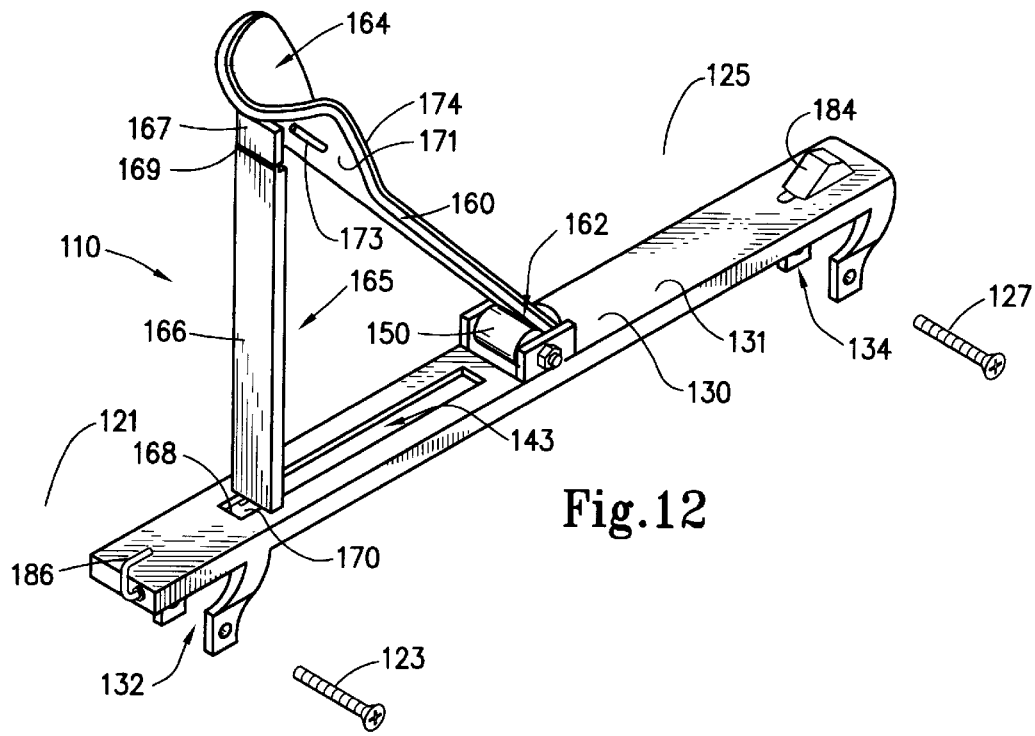
Fig.12
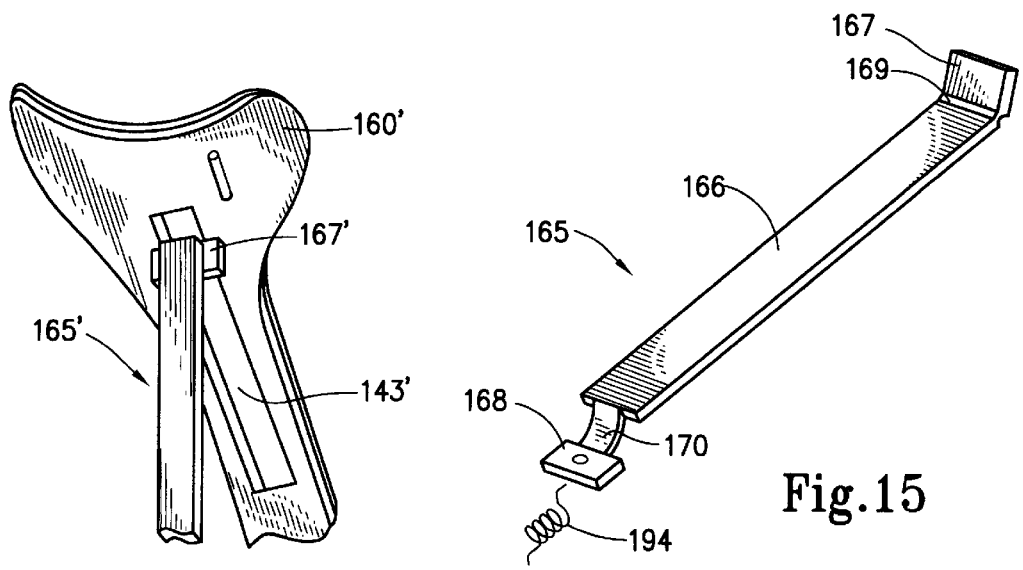
Fig.16
Fig.15

ARM REST FOR POLE-LIKE OBJECTS

FIELD OF INVENTION

The present invention broadly relates to arm rest devices for pole-like objects. More particularly, however, the present invention relates to an arm rest operative to support a user's forearm in an elevated position above a pole-like object to relieve tension thereon during use. Specifically, the present invention concerns arm rests adapted for use with fishing poles.

BACKGROUND OF THE INVENTION

The sport of fishing is an activity enjoyed by many which typically utilizes a pole-like object in the form of a fishing rod and its associated fishing line and reel. Depending upon the type of fishing undertaken, the angler casts the line having bait or a lure at the free-end thereof to a desired location in an attempt to attract a fish. When caught, the angler reels the fish in by means of a reel to which the other end of the line is attached. The fishing rod serves several purposes. On one hand, the rod permits the angler to achieve greater distances with a cast. The flexibility also permits the angler to manipulate the bait or lure to give it a more life-like action. Moreover, the flexibility of the rod allows the angler to retrieve the fish when caught so as to avoid breaking the light-weight line used to catch the fish.

Prior art fishing poles abound with design variations concerning primarily size, weight, appearance, flexibility and reliability. The conventional fishing pole, whether of the spinning reel type or the fly reel type, is generally characterized by at least a pair of releasably attachable flexible rod sections having a plurality of coaxially aligned guides through which the fishing line is threaded. A butt section of the rod has an end portion thereof provided with a hand-hold grip and a reel seat to which a reel with the coiled fishing line is attached.

After casting, an angler generally places the butt end portion of the fishing pole against the side or underside of his/her forearm to steady the rod when reeling in or playing a fish. To be effective at the sport of fishing, an angler may need to execute numerous casts and be quite patient in order to attract fish. Over time, muscle fatigue builds up in the angler's forearm as a result of these repeated exertions which can distract the angler and make the activity less enjoyable. This is particularly true for children or others who may have less strength in the wrist and forearm area.

Numerous devices and structures have been developed in the past to reduce this fatigue by providing an auxiliary support for a fishing pole. For example, U.S. Pat. No. 3,367,056 to Johnson describes a cradle support for casting rods to reduce fatigue. A clamp, such as a hose clamp, fastens to the handle of a conventional fishing rod and this clamp mounts an elongated strip of spring steel having a curved cradle piece at its free end. The cradle is shaped to receive the user's forearm. U.S. Pat. No. 5,313,735 to Latouche teaches a fishing rod handle extension that has a sleeve mount having interlocking splines. The sleeve mount extends over the butt end portion of the handle so as to provide a rotatable mount. Alternatively, a clamp mount may be employed. An extension piece is connected to the mount and has an elongated flange configured in a concave shape to receive the angler's forearm.

In U.S. Pat. No. 5,390,438 to Warren, Jr., an arm support is formed as an extension out of the butt end of the handle. Here, a tubular mount has a straight portion that is mated into a bore in the handle of the fishing pole. Curved portions of this support are shaped to configure to the forearm. The arm support is formed out of an integral piece of molded plastic so as to have some slight resiliency. U.S. Pat. No. 2,146,350 to Roberts shows an auxiliary rod support having a clamp that secures to the handle of the fishing pole. An adjustable arm is held in an upright position by the clamp, and a C-shaped arm receiver is adjustably positioned at one end of the arm opposite the clamp. The purpose of this device is described to be for stabilizing or steadying the rod during use.

U.S. Pat. No. 5,212,900 to Perry teaches the fastening of a forearm piece parallel to the handle of a fishing rod. An upper arm support piece is then pivotally secured to the forearm piece. In U.S. Pat. No. 5,159,775 to Sutula, Jr., a forearm support telescopically receives the butt end portion of the fishing rod, and a hook-shaped wrist support extends over the angler's wrist, which, in conjunction with a Velcro® strap secures the upper forearm to the device. Finally, U.S. Pat. No. 2,212,212 to Planitz teaches a wire bracket having a smaller loop portion in which the handle of the fishing rod may rest and a larger loop portion that is inverted and sized to receive the angler's forearm.

Other patents of general interest in this field include U.S. Pat. No. 4,014,129 to Capra, U.S. Pat. No. 5,581,913 to Swisher, U.S. Pat. No. 5,564,217 to Riedell, U.S. Pat. No. 5,551,184 to Grosse, U.S. Pat. No. 5,520,312 to Maddox and U.S. Pat. No. 2,244,408 to Thompson.

In spite of the advantages of the various devices used in the past for reducing fatigue on an angler's forearm, there remains a need for a more versatile arm rest which an angler can selectively actuate when desired to elevate the forearm above the butt end portion of the fishing pole, thereby to reduce fatigue during use. There is a further need for such an arm rest which can be actuated with little effort and without distracting from the angler's concentration. The present invention is directed to meeting these needs, among others.

SUMMARY OF INVENTION

It is an object of the present invention to provide a new and useful arm rest which is adapted for use with elongated pole-like objects, such as fishing poles, to support a user's forearm during use.

Another object of the present invention is to provide a new and useful arm rest for fishing poles which can be readily actuated with little effort.

A further object of the present invention is to provide a new and useful fishing pole having an associated arm rest which is operative to support a user's forearm while fishing.

Yet another object of the present invention is to provide an arm rest for fishing poles and other pole-like objects which is simplified and lightweight in construction, which is convenient for storage and which is relatively inexpensive to manufacture.

According to the present invention, then, an arm rest is adapted for use with an elongated fishing pole and operates to support a user's forearm while fishing. The arm rest comprises a mount adapted to releasably attach to a butt end portion of the fishing pole and a forearm cradle. The forearm cradle has a support surface sized and adapted to receivably support the user's forearm when the mount is attached to the butt end portion and the user grasps a hand-hold grip of the fishing pole. The forearm cradle is pivotally disposed on the mount between a stowed position wherein the forearm cradle extends along a longitudinal axis of the fishing pole, and a deployed position wherein the forearm cradle extends at an angle relative to the longitudinal axis in order to elevate the user's forearm above the butt end portion and support the forearm during use.

The forearm cradle has a proximal end portion pivotally connected to the mount and extends from the proximal end portion to terminate at a flared distal end portion. A fastening structure extends through the mount and the proximal end portion to pivotally interconnect the forearm cradle to the mount. A cushioning layer is preferably disposed on the forearm cradle's support surface.

The arm rest of the present invention also includes a selectively actuable locking mechanism which is moveable between a locked position wherein the locking mechanism engagably retains the forearm cradle in the stowed position, and an unlocked position wherein the locking mechanism disengages to permit the forearm cradle to pivot from the stowed position to the deployed position. Preferably, this locking mechanism includes a finger slide operative to actuate the locking mechanism between the locked and unlocked positions. The locking mechanism also includes a latch which is adapted to releasably engage the forearm cradle to retain the forearm cradle in the stowed position, and this latch engages either the distal end portion of the forearm cradle or the proximal end portion thereof.

The proximal end portion of the forearm cradle may be formed to include a pair of spaced-apart grooves. A first one of these grooves is alignable with the latch when the forearm cradle is in the stowed position to prevent movement thereof and a second one of these grooves is alignable with the latch when the forearm cradle is in the deployed position to prevent movement thereof. A spring preferably interconnects the proximal end portion and the mount, which spring operates to resiliently urge the forearm cradle into the deployed position.

In two embodiments of the present invention, a cradle brace is also provided in order to interconnect the forearm cradle to the mount. This cradle brace is moveable with the forearm cradle between a stored position wherein the cradle brace is coextensive with the forearm cradle alongside the fishing pole's longitudinal axis and a cradle extended position where the cradle brace is oriented at an angle relative to the longitudinal axis. When in the extended position, the cradle brace operates to resist movement of the forearm cradle from the deployed position to the stowed position. The cradle brace has opposite first and second end portions. The first end portion is pivotally disposed on either one of the mount and the forearm cradle and the second end portion is slidably disposed on another one of the mount and forearm cradle. A spring is interconnected between the cradle brace and the mount and this spring operates to resiliently urge the forearm cradle into the deployed position.

These and other objects of the present invention will become more readily appreciated and understood from a consideration of the following detailed description of the exemplary embodiments of the present invention when taken together with the accompanying drawings, in which:

BRIEF DESCRIPTION OF DRAWINGS

FIG. 4 is a side view in cross-section of the forearm cradle as viewed about lines 4—4 in FIG. 3;

FIG. 5 is a front view in cross-section of the forearm cradle as viewed about lines 5—5 in FIG. 3;

FIG. 7 is a rear end view of the armrest shown in FIGS. 1 and 2;

FIG. 8 is an end view in elevation of a grooved cylinder may form the proximal end portion of the forearm cradle for the arm rest according to the first exemplary embodiment of the present invention;

FIG. 9 is an exploded side view in partial cross-section of the grooved cylinder and its associated spring lock inserts.

FIG. 10 is a top plan view, partial broken away, of the arm rest according to the first exemplary embodiment of the present invention and showing the forearm cradle thereof in the stowed position;

FIG. 11 is a top plan view, in partial cross-section, of the armrest according to the first exemplary embodiment of the present invention and showing the forearm cradle thereof in the deployed position;

FIG. 12 is a perspective view of the arm rest according to a second exemplary embodiment of the present invention;

FIG. 15 is a perspective view showing the construction of the cradle brace for use with the arm rest according to the second exemplary embodiment of the present invention;

FIG. 16 is a partial perspective view showing an alternative construction for the cradle brace and the forearm support for use with the arm rest according to the second exemplary embodiment of the present invention.

DETAILED DESCRIPTION OF THE EXEMPLARY EMBODIMENTS

The present invention relates to an arm rest which is adapted for use with elongated pole-like objects to support a user's forearm to relieve tension thereon during use. While the exemplary embodiments of the arm rest are described herein with reference to a fishing pole in the form of a spin-cast rod, it should be appreciated that the arm rest of the present invention may also be readily adapted for use with other elongated pole-like objects, such as shovels, mops, weedeaters, hedge trimmers and the like. Moreover, the arm rest of the present invention is also well suited for other types of fishing poles, such as fly rods.

Figure 1:
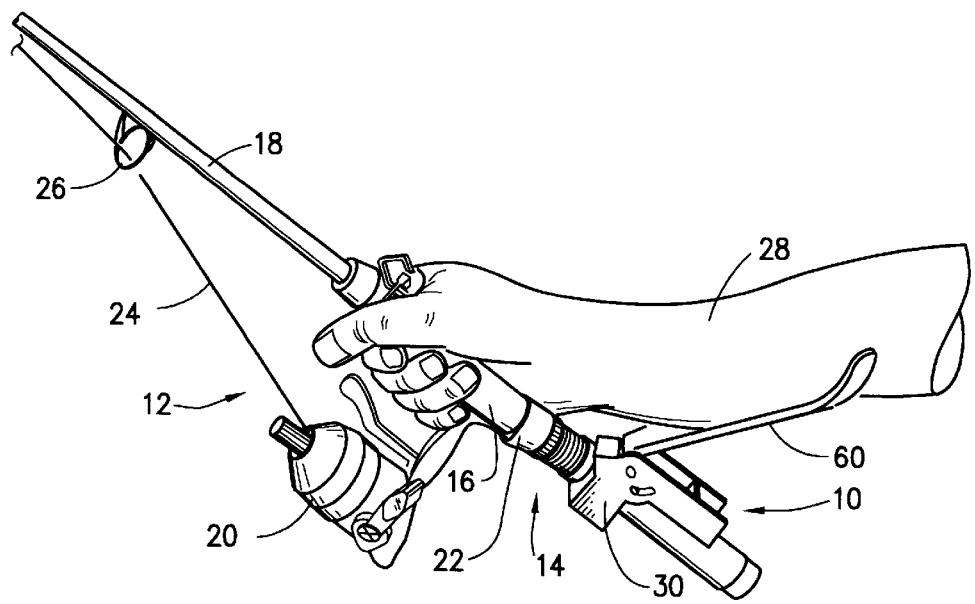
FIG. 1 is a perspective view of the arm rest according to the first exemplary embodiment of the present invention and shown attached to the butt end portion of a fishing pole to support a user's forearm while fishing.

With initial reference to FIG. 1, a first exemplary embodiment of the arm rest 10 of the present invention is shown mounted to a conventional elongated fishing pole 12. Fishing pole 12 has a butt end portion 14 provided with a hand-hold grip 16 and includes a plurality of attachable rod sections, such as rod section 18, which extend from butt end portion 14 to terminate at a distal tip (not shown). A spinning reel 20 is mounted to butt end portion 14 and is secured thereto by a screw locking nut 22. Reel 20 houses a coiled length of fishing line 24 which is threaded through a plurality of guides, such as guide 26 on rod section 18. The end of fishing line 24 would, of course, be secured to a bait or lure for attracting fish.

Figure 2:
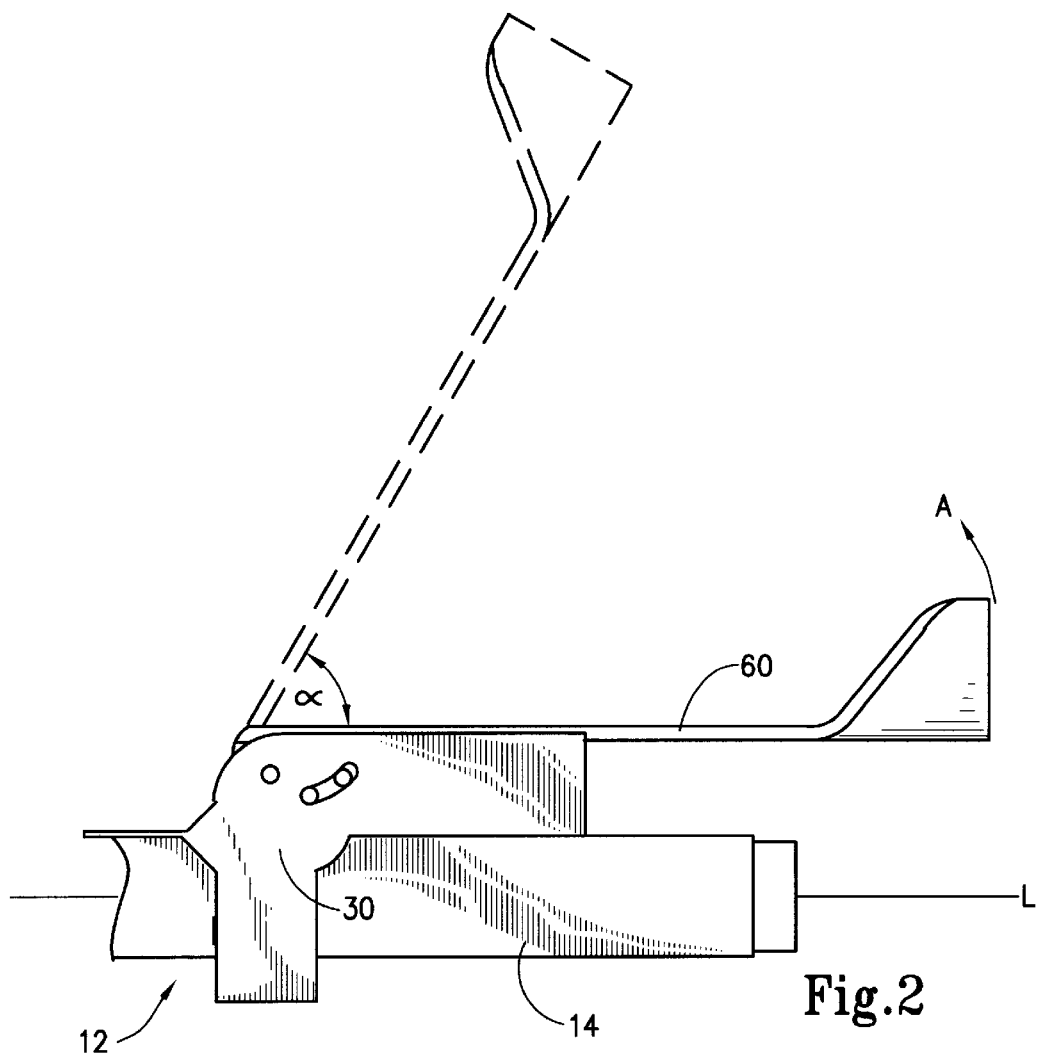
FIG. 2 is a partial side view in elevation of the arm rest shown in FIG. 1, and specifically showing the ability of its forearm cradle to pivot between a stowed position and a deployed position (depicted in phantom)

Arm rest 10 is disposed on butt end portion 14 and broadly includes a mount 30 adapted to releasably attach to butt end portion 14 and a forearm cradle 60 which supports an angler's forearm 28 above butt end portion 14 during use of fishing pole 12. As shown in FIG. 2, forearm cradle 60 is pivotally disposed on mount 30 and is operative to move between a stowed position and a deployed position, as shown in phantom. When in the stowed position, forearm cradle 60 extends along a longitudinal axis "L" of fishing pole 12 such that it is alongside butt end portion 14. When pivoted into the deployed position, in the direction of arrow "A", forearm cradle 60 extends at an angle "α" relative to longitudinal axis "L" to elevate the angler's forearm above butt end portion 14, thereby to support the forearm during use of fishing pole 12. As discussed in greater detail below with reference to FIGS. 6 and 7, the forearm cradle 60 may be selectively actuated between the stowed and deployed positions and retained in each of these positions during use.

Figure 3:
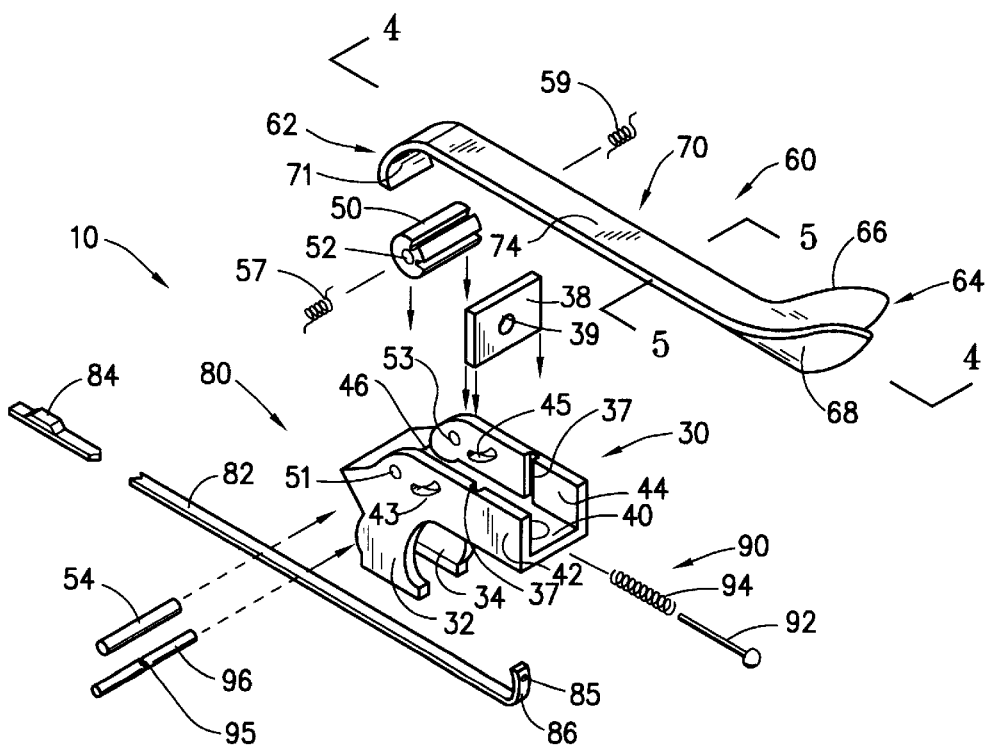
FIG. 3 is an exploded perspective view of the arm rest constructed according to the first exemplary embodiment of the present invention.

The preferred construction for those components which comprise arm rest 10 according to the first exemplary embodiment of the present invention may best be appreciated with reference to FIGS. 3–8. Forearm cradle 60 is preferably constructed to accommodate the size and contour of a user's forearm. As shown in FIGS. 3–5, forearm cradle 60 has a proximal end portion 62 adapted for pivotally connection to mount 30, and extends from proximal end portion 62 to terminate at a flared distal end portion 64 that is defined by a pair of divergent wings 66 and 68. A mid portion 70 of forearm cradle 60 extends between proximal end portion 62 and distal end portion 64. Wings 66 and 68 are contoured to provide lateral support to the user's forearm during use of the fishing pole. Forearm cradle 60 has a support surface 72 and a cushioning layer 74 is secured, through adherence or otherwise, to a majority of support surface 72 to provide a padded rest for the angler's forearm during use of arm rest 10.

Figure 6:
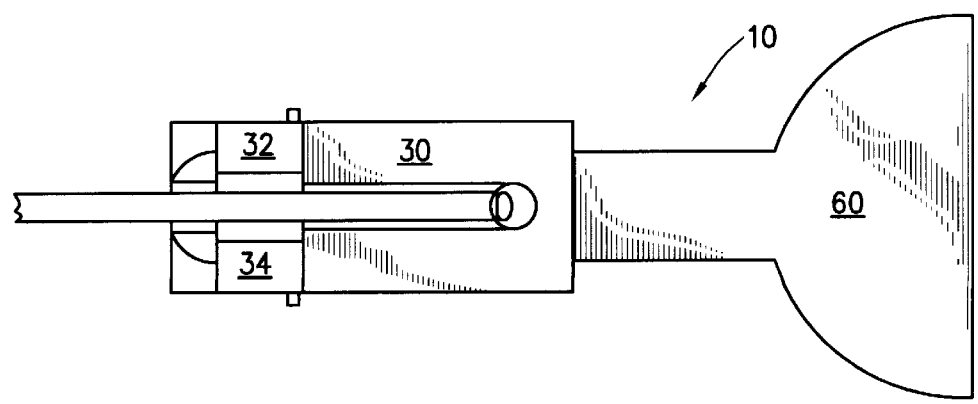
FIG. 6 is a partial bottom plan view of the arm rest according to the first exemplary embodiment of the present invention.

As shown in FIG. 3,6 and 7 mount 30 includes a pair of spaced apart and downwardly diverging legs 32 and 34 which are sized and adapted to releasably engage the fishing pole's butt end portion 14. With specific reference to FIG. 7, each of legs 32 and 34 has an arcuate inner surface, 33 and 35 respectfully, which follows the contour of the circumferential outer surface of butt end portion 14. Together, legs 32 and 34 form a clamp so that mount 30 may be either snap-fitted onto butt end portion 14 or slidably fit thereon. To this end, it is preferred that legs 32 and 34 be spring biased toward one another to securely retain mount 30 in the position shown in FIG. 1. Alternatively, and as shown in phantom in FIG. 7, a cooperative nut and bolt fastener 36, or other appropriate fastening structure, could be employed to fixedly secure mount 30 to butt end portion 14.

Mount 30 is preferably formed as a unitary, single-piece construction from lightweight plastic material. Mount 30 includes a base 40 and a pair of spaced apart sidewalls 42 and 44 which project upwardly therefrom. Base 40 has opposed upper and lower base surfaces which, along with sidewalls 42 and 44, define a region 46 within which various parts of a locking mechanism 80 associated with arm rest 10 are contained.

As stated above, proximal end portion 62 of forearm cradle 60 is pivotally disposed relative to mount 30. To accomplish this, a grooved cylinder 50 is sized for insertion into region 46 and has a central bore 52 extending therethrough which is alignable with opposed apertures 51 and 53 formed, respectively, through sidewalls 42 and 44. A mounting pin 54 may then be inserted through apertures 51, 53 and bore 52 to permit grooved cylinder 50 to rotate within region 46 between sidewalls 42 and 44. Of course, a cooperative nut and bolt fastening structure could also be employed to rotatably journal grooved cylinder 50 within region 46.

The forearm cradle's lower surface 71 is arcuately contoured at proximal end portion 62 so that proximal end portion 62 may be secured, through an appropriate adhesive or the like, to a portion of the grooved cylinder's outer circumferential surface. Alternatively, of course, grooved cylinder 50 and forearm cradle 60 could be integrally molded so that grooved cylinder 50 actually defines proximal end portion 62.

A preferred construction for grooved cylinder 50 is shown in FIGS. 8 and 9. Grooved cylinder is formed to include a pair of circumferentially spaced apart grooves 48 and 49. The grooved cylinder's central bore 52 includes a first enlarged opening 56 within which a first biasing spring 57 is inserted and a second enlarged opening 58 within which a second biasing spring 59 is inserted. As such, when grooved cylinder 50 is rotatably disposed within region 46, first and second biasing springs 57 and 59 act together to resiliently urge forearm cradle 60 into the deployed position shown in FIG. 1.

With reference again to FIG. 3, a selectively actuable locking mechanism 80 is associated with arm rest 10 and operates to move between a locked position wherein the locking mechanism 80 engagedly retains forearm cradle 60 in the stowed position, and an unlocked position wherein locking mechanism 80 disengages from forearm cradle 60 to permit forearm cradle 60 to pivot from the stowed position to the deployed position. To this end, locking mechanism 80 includes an elongated slide bar 82 having a finger tab 84 disposed on a first end portion thereof and an aperture 85 formed through a bent second end portion 86 thereof. Locking mechanism 80 also includes a spring and latch assembly 90 adapted to interconnect slide bar 82 to grooved cylinder 50 to selectively retain forearm cradle 60 in either the stowed position or the deployed position. More specifically, spring latch mechanism 90 includes a retaining pin 92, an associated retaining spring 94, and a latch 96. Mount 30 includes a divider wall 38 which is sized and adapted for slidable translation along opposed slots 35 and 37 respectively formed in sidewalls 42 and 44.

As shown in FIGS. 10 and 11, arm rest 10 is assembled such that the bent end portion 86 of slide bar 82 extends through an opening 41 formed in floor 40. With divider wall 38 in place, retaining pin 92 is inserted through both the aperture formed in bent end portion 86, as well as the hole formed in dividing wall 38. Retaining pin 92 is received through retaining spring 94 and inserted into a hole 95 formed in latch 96.

Latch 96 is sized and adapted so that it extends across region 46 for translation along opposed tracking slots 43 and 45 which are respectively, formed in first and second sidewalls 42 and 44.

As shown in FIG. 10, when forearm cradle 60 is in the stowed position, locking mechanism 80 is operative to resiliently urge latch 96 into engagement with upper groove 48 formed in grooved cylinder 50. When in the locked position, retaining spring 94 exerts a restorative force against divider wall 38 to urge latch 96 into engagement with groove 48.

Locking mechanism 80 is actuated between the locked and unlocked positions by the user manipulating finger tab 84 shown in FIG. 3, which causes slide bar 82 to translate along the fishing pole's butt end portion 14. That is, and as shown in FIG. 11, activation of slide bar 82 in the direction of arrow "B" causes retaining pin 92 to translate along the slots formed in sidewalls 42 and 44, thereby to disengage from grooved cylinder 50. As stated above, grooved cylinder 50 is rotatably journaled within region 46 so that it biases forearm cradle 60 into the deployed position. Accordingly, dislodgement of latch 96 from grooved cylinder 50 causes forearm cradle 60 to automatically deploy so that it elevates the user's forearm relative to the fishing pole's butt end portion. Thereafter, upon release of the finger tab 84 associated with slide bar 82, the restorative force of spring 94 causes the locking mechanism 80 to return to the locked position shown in FIG. 10. Now, however, since the forearm cradle 60 is in the deployed position, latch 96 is urged into locking engagement with the second groove 49 associated with grooved cylinder 50, thereby to retain forearm cradle 60 in the deployed position.

With the foregoing description in mind with reference to the first exemplary embodiment of the arm rest of the present invention, it should be understood that the arm rest can be selectively actuated by a user to situate the forearm cradle in either the stowed position or the deployed position. When in the stowed position, the forearm cradle does not interfere with the angler's ability to execute those mechanics associate with fishing, such as casting, playing a fish and reeling in a fish. However, the present invention recognizes that continuous executions of these mechanics of fishing can cause a degree of fatigue to build up in the angler's forearm. This is particularly true for children or others who may have reduced strength in the wrist and forearm area, as well as those who are not experienced at fishing. The present invention, therefore, allows an angler to support his/her forearm in a elevated position above the fishing pole's butt end portion to relieve tension on the forearm area. Moreover, the arm rest can be quickly actuated by the angler's casting hand, without interference, and in such a manner that the angler does not have to re-adjust his/her grip.

A second exemplary embodiment of the arm rest of the present invention may be seen now in FIGS. 12–16. Here again, arm rest 110 is constructed so that its forearm cradle 160 is pivotally disposed on mount 130 so that it is operative to move between a stowed position and a deployed position. Forearm cradle 160 is constructed similarly to forearm cradle 60 discussed above with reference to the first exemplary embodiment of the present invention in that it has a proximal end portion 162 pivotally connected to mount 130, a flared distal end portion 164 and a cushioning layer 174. Here, proximal end portion 162 is formed to include a cylinder 150, which is not grooved.

Mount 130 and its associated locking mechanism 180 are constructed somewhat differently than discussed above. For example, mount 130 is somewhat longer so that it has a pair of clamps 132 and 134. Clamp 132 has an associated fastening structure comprising nut 121 and bolt 123, and clamp 134 has an associated fastening structure comprising nut 125 and bolt 127. Of course, as discussed above, these fastening structures are not necessarily required in order to secure mount 132 to the fishing poles butt end portion.

Figure 13:
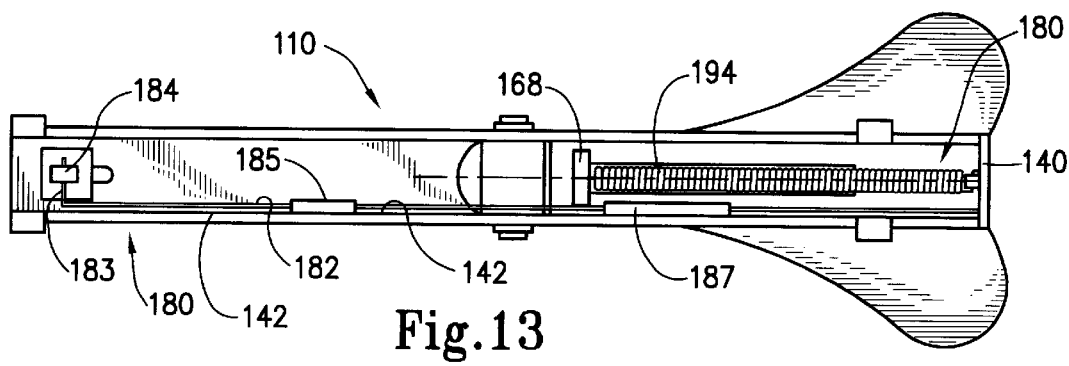
FIG. 13 is a bottom plan view of the arm rest according to the second exemplary embodiment of the present invention, and showing the forearm cradle thereof in the stowed position.
Figure 14:
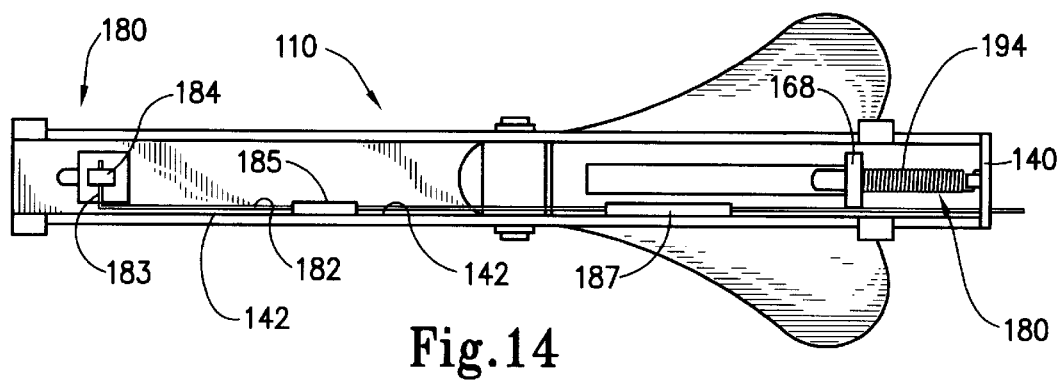
FIG. 14 is a bottom plan view of the arm rest according to the second exemplary embodiment of the present invention, and showing the forearm cradle thereof in the deployed position.

A thumb tab 184 is again manually activated by the user to cause forearm cradle 160 to move between the stowed position shown in FIG. 13 and the deployed position shown in FIGS. 12 and 14. Elongated slide rod 182 has a first bent end portion 183 connected to thumb tab 184 and a second bent end portion 186 that defines a latch adapted to be received in a sleeve 173 disposed on the forearm cradle's lower surface 171, thereby to retain the forearm cradle 160 in the stowed position. A pair of slide rod sleeves 185 and 187 may be positioned along one of the mount's sidewalls 142 through which rod 182 is slidably received.

A cradle brace 165 interconnects forearm cradle 160 to mount 130. Cradle brace 165 has a main body portion 166, a first end portion 167 and second end portion 168. First end portion 167 is connected to main body portion 166 by a first living hinge 169, and second end portion 168 is connected to main body portion 166 by a second living hinge 170. Preferably, first end portion 167 is permanently secured to lower surface 171 of forearm cradle 160 so that cradle brace 165 is pivotal with respect thereto. Second end portion 168 is formed as a tab which is sized and adapted to be inserted through a tracking slot 143 formed in mount 130 for translation therealong. A retaining spring 194 interconnects second end portion 168 to a rear wall 140 of mount 130, as shown in FIGS. 13 and 14, and this retaining spring 194 is operative to urge forearm cradle 160 into the deployed position shown in FIGS. 12 and 14.

It should be appreciated, then, that when forearm cradle 160 is in the stowed position shown in FIG. 13, both it and the main body portion 166 of cradle brace 165 are coextensive with an upper surface 131 of mount 130, and that the forearm cradle 160 is retained in this stowed position by virtue of second bent end portion 186 being received in sleeve 173.

However, upon actuation of thumb tab 184, second bent end portion 186 becomes disengaged from sleeve 173 and the restorative force of retaining spring 194 causes the second end portion 168 of cradle brace 165 to move to the rearmost portion of tracking slot 143 as shown in FIGS. 12 and 14 which resultingly urges forearm cradle 160 into the deployed position.

In order to return forearm cradle 160 to the stowed position shown in FIG. 13, a user merely urges cradle brace 165 so that its second end portion 168 moves forwardly within tracking slot 143 to its forwardmost position. Thereafter, the user can manipulate thumb tab 184 so that latch 186 is reinserted into sleeve 173, thereby to retain forearm cradle 160 in the stowed position.

With the above description in mind relating to the arm rest 110 according to the second exemplary embodiment of the present invention, it may be appreciated that the construction of the cradle brace can be somewhat modified so that is instead slidably disposed on the forearm cradle and pivotally connected to the mount. For example, FIG. 16 illustrates the possibility that a tracking slot 143' can be formed in forearm cradle 160' with cradle brace 165' having a first end portion 167' slidably disposed therealong.

Figure 17:
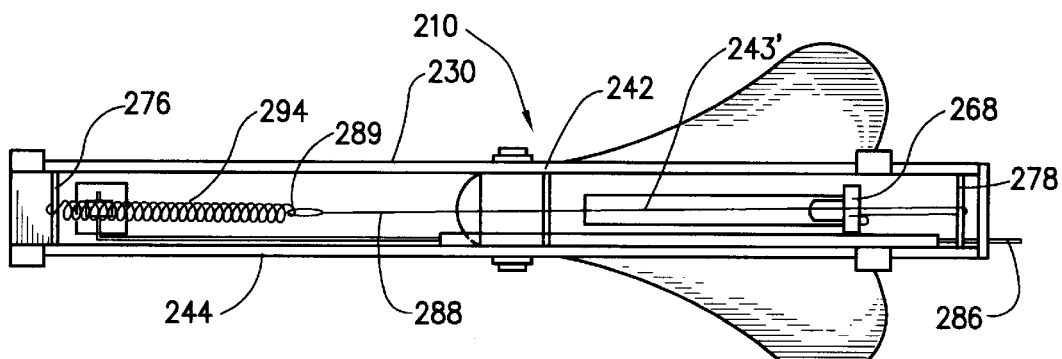
FIG. 17 is a bottom plan view of an arm rest constructed according to the third exemplary embodiment of the present invention.

Finally, a third exemplary embodiment of the arm rest according to the present invention is shown in FIG. 17. Here, arm rest 210 is constructed the same as arm rest 110 discussed above with the only exception being that the inner connection of the cradle brace's second end portion 268 to mount 230 is different. Here, longitudinally spaced apart pins 276 and 278 extend between the mount's opposed first and second sidewalls 242 and 244. A wire 288 is interconnected between the cradle brace's second end portion 268 and a retaining spring 294. A portion of wire 288 is looped around second pin 278 and retaining spring 294 is interconnected between wire 288 and first pin 276. Upon manipulation of the finger tab, latch 286 disengages from forearm cradle 260 and the restorative force of retaining spring 294 operates to urge the cradle brace's second end portion 268 to the rearmost region of tracking slot 243, thereby to urge forearm support 260 into the deployed position shown in FIG. 17. Forearm cradle can be returned to the stowed position and latched in the same manner discussed above with reference to the second exemplary embodiment so that the cradle brace's second end portion 268 moves to the forwardmost portion of tracking slot 243.

Accordingly, the present invention has been described with some degree of particularity directed to the exemplary embodiment's of the present invention. It should be appreciated, though, that the present invention is defined by the following claims construed in light of the prior art so that modifications or changes may be made to the exemplary embodiment's of the present invention without departing from the inventive concepts contained herein.

I claim:

1. An arm rest adapted for use with an elongated fishing pole having a butt end portion provided with a hand-hold grip, said arm rest operative to support a user's forearm while fishing, comprising;
   (a) a mount adapted to releasably attach to the butt end portion; and
   (b) a forearm cradle having a support surface sized and adapted to receivably support the user's forearm when said mount is attached to the butt end portion and the user grasps the hand-hold grip, said forearm cradle pivotally disposed on said mount and operative to move between a stowed position wherein said forearm cradle extends along a longitudinal axis of the fishing pole and a deployed position wherein said forearm cradle extends at an angle relative to the longitudinal axis to elevate the user's forearm above the butt end portion, thereby to support the forearm during use of the fishing pole, said forearm cradle being resiliently biased into the deployed position.

2. An arm rest according to claim 1 wherein said forearm cradle includes a cushioning layer disposed on said support surface.

3. An arm rest according to claim 1 wherein said forearm cradle has a proximal end portion pivotally connected to said mount and extends from said proximal end portion to terminate at a flared distal end portion.

4. An arm rest according to claim 3 including a fastening structure extending through said mount and said proximal end portion to pivotally interconnect said forearm cradle to said mount.

5. An arm rest according claim 1 including a cradle brace pivotally interconnected between said forearm cradle and said mount, said cradle brace movable with said forearm cradle between a stored position wherein said cradle brace is coextensive with said forearm cradle alongside said butt end portion and a cradle extended position wherein said cradle brace is oriented at an angle relative to the longitudinal axis, said cradle brace operative in the cradle extended position to resist movement of said forearm cradle from the deployed position to the stowed position.

6. An arm rest according to claim 5 wherein said cradle brace has a first end portion pivotally disposed on one of said mount and said forearm cradle and a second end portion slidably disposed on another of said mount and said forearm cradle.

7. An arm rest according to claim 6 including a spring interconnected between said cradle brace and said mount and operative to resiliently urge said forearm cradle into the deployed position.

8. An arm rest according to claim 1 including a selectively actuable locking mechanism operative to move between a locked position wherein said locking mechanism engagedly retains said forearm cradle in the stowed position and an unlocked position wherein said locking mechanism disengages from said forearm cradle to permit said forearm cradle to pivot from the stowed position to the deployed position.

9. An arm rest according to claim 8 wherein said locking mechanism includes a finger slide operative to actuate said locking mechanism between the locked position and the unlocked position.

10. An arm rest according to claim 8 including a spring interconnected between said forearm cradle and said mount and operative to resiliently urge said forearm cradle into the deployed position.

11. An arm rest according claim 8 wherein said locking mechanism includes a latch adapted to releasably engage said forearm cradle to retain said forearm cradle in the stowed position.

12. An arm rest according to claim 11 wherein said latch engages a selected one of said distal end portion and said proximal end portion.

13. An arm rest according to claim 12 wherein said latch engages said proximal end portion and wherein said locking mechanism includes a finger slide operative to actuate said locking mechanism between the locked position and the unlocked position, said finger slide interconnected to said latch by a spring operative to resiliently urge said latch into engagement with said proximal end portion.

14. An arm rest according to claim 13 wherein said proximal end portion is formed to include a pair of spaced apart grooves, a first one of said grooves alignable with said latch when said forearm cradle is in the stowed position to prevent movement thereof and a second one of said grooves alignable with said latch when said forearm cradle is in the deployed position to prevent movement thereof.

15. An arm rest according to claim 14 including a spring interconnected between said proximal end portion and said mount and operative to resiliently urge said forearm cradle into the deployed position.

16. An arm rest adapted for use with an elongated fishing pole having a butt end portion provided with a hand-hold grip, said arm rest operative to support a user's forearm while fishing, comprising;
   (a) a mount adapted to releasably attach to the butt end portion;
   (b) a forearm cradle having a support surface sized and adapted to receivably support the user's forearm when said mount is attached to the butt end portion and the user grasps the hand-hold grip, said forearm cradle pivotally disposed on said mount and operative to move between a stowed position wherein said forearm cradle extends along a longitudinal axis of the fishing pole and a deployed position wherein said forearm cradle extends at an angle relative to the longitudinal axis to elevate the user's forearm above the butt end portion, thereby to support the forearm during use of the fishing pole; and
   (c) a spring interconnected between said forearm cradle and said mount and operative to resiliently bias said forearm cradle into the deployed position.

17. A fishing pole comprising:
   (a) an elongated rod having a butt end portion and extending from said butt end portion along a longitudinal axis to terminate at a rod tip;
   (b) a hand-hold grip disposed on said butt end portion;
   (c) a reel disposed on said butt end portion; and
   (d) an arm rest associated with said elongated rod, said arm rest including a mount releasably disposed on said butt end portion and a forearm cradle having a support surface sized and adapted to receivably support the user's forearm when the user grasps the hand-hold grip, said forearm cradle pivotally disposed on said mount and operative to move between a stowed position wherein said forearm cradle extends along the longitudinal axis and a deployed position wherein said forearm cradle extends at an angle relative to the longitudinal axis to elevate the user's forearm above the butt end portion, thereby to support the forearm during use of the fishing pole, said arm rest further including a selectively actuable locking mechanism operative to move between a locked position wherein said locking mechanism engagedly retains said forearm cradle in the stowed position and an unlocked position wherein said locking mechanism disengages from said forearm cradle to permit said forearm cradle to pivot from the stowed position to the deployed position.

18. A fishing pole according claim 17 wherein said locking mechanism includes a finger slide operative upon actuation to toggle said locking mechanism between the locked position and the unlocked position and a latch interconnected to said finger slide and adapted to engage said forearm cradle when said forearm cradle is in the deployed position to prevent movement thereof.

19. A fishing pole according claim 18 including a spring interconnected between said finger slide and said latch to resiliently urge said latch into engagement with said forearm cradle.

20. A fishing pole according to claim 17 wherein said forearm cradle has a proximal end portion pivotally connected to said mount and extends from said proximal end portion to terminate at a flared distal end, and wherein said forearm cradle includes a cushioning element adhered to said support surface.

* * * * *